(12) United States Patent
Reiners

(10) Patent No.: US 7,113,652 B2
(45) Date of Patent: Sep. 26, 2006

(54) SYSTEM AND METHOD FOR USING NORMALIZED GRAY SCALE PATTERN FIND

(75) Inventor: Lawrence Lee Reiners, Apple Valley, MN (US)

(73) Assignee: Banner Engineering Corp., Minneapolis, MN (US)

( * ) Notice: Subject to any disclaimer, the term of this patent is extended or adjusted under 35 U.S.C. 154(b) by 728 days.

(21) Appl. No.: 10/340,168

(22) Filed: Jan. 9, 2003

(65) Prior Publication Data
US 2004/0136611 A1 Jul. 15, 2004

(51) Int. Cl.
G06K 9/32 (2006.01)
G06K 9/62 (2006.01)
G06K 9/54 (2006.01)

(52) U.S. Cl. .................. 382/291; 382/289; 382/107; 382/103

(58) Field of Classification Search .............. 382/291, 382/289, 298, 215, 103, 107, 155; 358/1.9; 359/29; 356/479; 707/104
See application file for complete search history.

(56) References Cited

U.S. PATENT DOCUMENTS

| | | | |
|---|---|---|---|
| 6,631,017 B1 * | 10/2003 | Khoury | 359/29 |
| 6,658,149 B1 * | 12/2003 | Wakahara et al. | 382/215 |
| 6,678,404 B1 * | 1/2004 | Lee et al. | 382/155 |
| 6,954,544 B1 * | 10/2005 | Jepson et al. | 382/107 |
| 6,963,425 B1 * | 11/2005 | Nair et al. | 358/1.9 |
| 2003/0065654 A1 * | 4/2003 | Ikushima | 707/3 |
| 2003/0103212 A1 * | 6/2003 | Westphal et al. | 356/479 |
| 2003/0219146 A1 * | 11/2003 | Jepson et al. | 382/103 |
| 2004/0062424 A1 * | 4/2004 | Mariani et al. | 382/118 |
| 2004/0131280 A1 * | 7/2004 | Reiners | 382/289 |
| 2004/0131281 A1 * | 7/2004 | Reiners | 382/298 |
| 2004/0136611 A1 * | 7/2004 | Reiners | 382/291 |

OTHER PUBLICATIONS

Yee et al., Application of normalized gray-scale correlation, Proceedings of SPIE, vol. 1959, pp. 69-79, 1993.*

Chemaly, Feature inspection using normalized cross correlation and mathematical morphology, Vision 89 conference proceedings, pp. 2/13-22, Apr. 1989.*

(Continued)

Primary Examiner—Sanjiv Shah
(74) Attorney, Agent, or Firm—Merchant & Gould P.C.

(57) ABSTRACT

A computer controlled system, method, and corresponding computer data product, for utilizing a normalized gray scale pattern find within a machine vision system. The system and method (a) correlates a reference image having a first spatial resolution having no particular degree of rotation within a first search region of interest of an acquired image to find a potential match location, (b) correlates a rotated reference image having the first spatial resolution at a particular degree of rotation within the first search region of interest to find a potential match location, (c) selects the potential match location and the particular degree of rotation corresponding to the highest correlation value, (d) increases the spatial resolution of the reference image at the particular degree of rotation to generate a new reference image and correlating the new reference image within a second search region of interest centered at the selected potential match location, (e) selects an updated potential match location corresponding to a location having the highest correlation value that is completely within the search region of interest, (f) repeats steps (d) and (e) for all available resolutions for the reference image, and (g) selects a match location and orientation of a reference image within the acquired image corresponding to the location having the highest correlation value.

21 Claims, 10 Drawing Sheets

OTHER PUBLICATIONS

Silver et al., "AI beefs up gray-scale correlation", The electronic system Design Magazine, vol. 18, pp. 89-90. Mar. 1988.*

Ballard, D. et al., Chapters 1 (Computer Vision), 2 (Image Formation), 4 (Boundary Detection), 6 (Texture) and 11 (Matching) from "Computer Vision," *Department of Computer Science, University of Rochester, Rochester, New York* (1982).

Glazer, F. et al., "Scene Matching by Hierarchical Correlation," *IEEE*, pp. 432-441 (1983).

* cited by examiner

FIG. 8
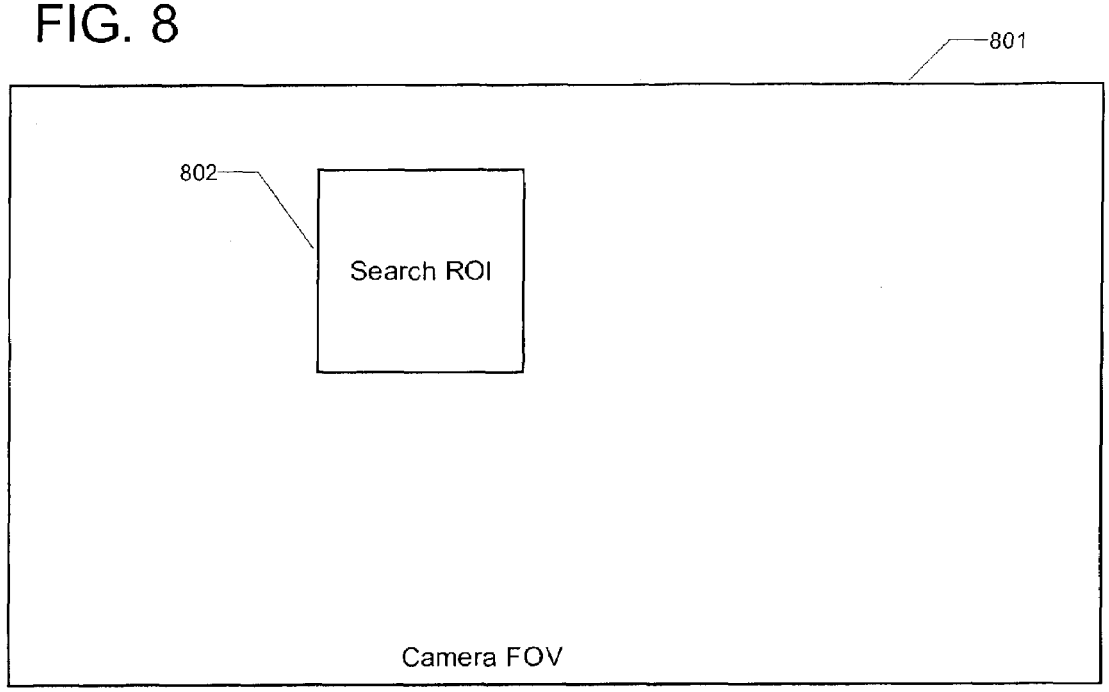
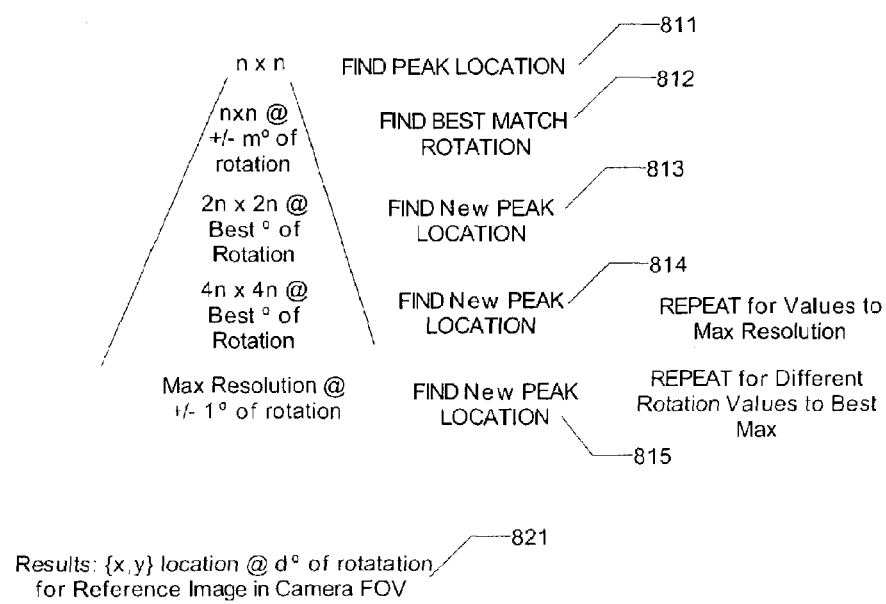
Results: {x,y} location @ d° of rotatation for Reference Image in Camera FOV

SYSTEM AND METHOD FOR USING NORMALIZED GRAY SCALE PATTERN FIND

TECHNICAL FIELD

The present invention relates to data processing of images within a machine vision system, and more specifically to a system and method for utilizing a normalized gray scale pattern find within a machine vision system.

BACKGROUND

Machine Vision has used numerous algorithms over the years to locate the object of interest in the Field Of View (FOV). Typically the user captures a reference image and identifies the object of interest by drawing a Region Of Interest (ROI) around it using a Graphical User Interface (GUI). The user also draws a search ROI to identify the maximum movement of the object of interest within the search ROI. Either the entire grayscale ROI or unique characteristics of the object of interest is saved in memory as a reference template. During an inspection the vision algorithm searches for the object of interest within the search ROI and if one is found and the match is within acceptable limits it can provide the match level and both the location and angular rotation of the object within the FOV. Key parameters are accuracy of match, accuracy of location, accuracy of rotation, and execution time of the algorithm A vision algorithm that the machine vision industry has traditionally used is the Normalized Grayscale Correlation (NGC) algorithm. This algorithm basically performs a cross-correlation between a "reference image" and an "inspection image" using normalized values. Cross-Correlation is a mathematical process of sliding the reference template across the search ROI and creating a 2D array of correlation results. The individual correlation results give an indication of the degree of match of the reference pattern with that particular location in the search ROI.

Normalization is a modification to the correlation algorithm to reduce the affects of changes in illumination on the correlation results.

Correlation is susceptible to minor rotational changes of the object and will fail if the inspection image is rotated more than approximately ±5 degrees from the reference template. Therefore the vision algorithm handles rotational variations of the inspection image by performing correlation with rotated versions of the reference template.

One form of the NGC formula is:

r=Numerator/Denominator where

Numerator=$(N*\Sigma(I*R))-(\Sigma I*\Sigma R)$

Denominator=$\{(N*\Sigma I^2-(\Sigma I)^2)*(N*\Sigma R^2-(\Sigma R)^2)\}^{1/2}$

N=number of pixels in reference template

I=inspection image

R=reference template

From the above formula it is easily seen that calculating a single correlation value requires numerous multiplications, additions, subtractions, divides, and square-roots. This needs to be repeated as the template is slid around the entire search ROI. The number of correlation results is (m2−m1+1)*(n2−n1+1) where the search ROI is m2×n2 and the object ROI is m1×n1. As an example assume that the m2=250, n2=200 (250×200), m1=100, and n1=100 (100×100) then the total number of correlation values is 15251. This operation requires:

- 305106257 multiples
- 457550000 adds
- 45753 subtracts
- 15251 divides
- 15251 square-roots Machine Vision applications require the vision algorithm to provide results in real time. This requirement places constraints on the implementation of the NGC algorithm. In order to reduce the computational time of correlation of the reference image with the inspection image different resolution images are created of both the reference image search ROI and inspection image search ROI. The creation of the lower resolution images shall be referred to as decimation.

One approach to creating the decimated image is by taking the average of a 2×2 array to form the next higher pixel value. This filters out the higher spatial frequency content leaving only the lower frequency characteristics of the image. This results in 2 pyramids, one of the reference image ROI, and the other of the inspection image search ROI. Each level of the pyramid reduces the size of the reference image ROI and inspection image search ROI by a factor of 2 in width and 2 in height. The spatial frequency bandwidth is reduced by a factor of 2 at each successive level. The highest resolution images are at the bottom of the pyramid. A course correlation search is then performed at the top of the pyramid. Table 1 shows the reduction in the number of arithmetic operations required at the top of the pyramid for 3 levels of decimation.

TABLE 1

| Level | m1 | n1 | m2 | n2 | Multiples | Adds | Subtracts | Divides | Square Roots |
|---|---|---|---|---|---|---|---|---|---|
| 1 × 1 | 100 | 100 | 250 | 200 | 305106257 | 457550000 | 45753 | 15251 | 15251 |
| 2 × 2 | 50 | 50 | 125 | 100 | 19401882 | 29075000 | 11628 | 3876 | 3876 |
| 4 × 4 | 25 | 25 | 62 | 50 | 1240567 | 1853750 | 2964 | 988 | 988 |
| 8 × 8 | 12 | 12 | 31 | 25 | 82186 | 121248 | 840 | 280 | 280 |

Points of interest, large correlation values, are then identified from the results of the course correlation search. Once points of interest have been identified at the top level of the pyramid an approach is required to follow the point(s) of interest down the pyramid to the highest level of resolution without following the wrong path. This reduces the total number of correlation values required to find the object in the inspection image resulting in a faster inspection time.

A shortcoming of the decimation approach is that blurring (loss of spatial frequency) of the image increases at each successive level of the pyramid. If decimation is carried far enough it would result in a uniformly smooth image with no features to be used for identification. Therefore, to increase performance it is desirable to have several levels to the pyramid, but to stop before being unable to find the object of interest due to a loss in the spatial frequency content. The amount of blurring introduced by decimation is also dependent upon the density of the spatial frequency content of the reference image ROI. Higher levels of decimation can be achieved, without significant loss of image content, with images containing lower spatial frequency. A means is therefore needed to determine the maximum number of decimation levels a reference image can tolerate without the loss of the required spatial frequency content necessary to identify the object of interest.

To accurately locate the object of interest the reference image must possess a minimum amount of both translational and rotational spatial frequency content. This requires that the reference image ROI have sufficient high spatial frequency content to produce a sharp correlation peak in the search ROI. Images with only low spatial frequency content have a flatter correlation peak causing minor pattern variations or noise to influence the location of the object of interest in the inspection image. A means is therefore required to determine the amount of both translational and rotational spatial frequency content of the reference image ROI.

Finally, the reference image ROI must not be distorted due to pixel saturation. Saturated pixels cause a loss of detail and may not move as the object of interest moves within the FOV. A means is therefore required to ensure that saturated pixels are minimized within the reference image ROI. The present invention disclosed herein overcomes the above limitations of the prior art machine-based vision systems.

SUMMARY OF THE INVENTION

The present invention includes a system and method for utilizing a normalized gray scale pattern find within a machine vision system. In accordance with the invention, one embodiment includes a computer controlled system for utilizing a normalized gray scale pattern find within a machine vision system. The system includes an image acquisition interface module for obtaining an acquired image from a image capture device, a image reference data module for providing a set of reference modules for use in locating a reference mark within the acquired image, and a image processing module for correlating the set of reference images within a set of search regions of interest to find the best match location. The image processing module uses a normalized gray scale pattern find process.

Another embodiment of the present invention includes a computer controlled method, and corresponding computer data product, for utilizing a normalized gray scale pattern find within a machine vision system. The method (a) correlates a reference image having a first spatial resolution having no particular degree of rotation within a first search region of interest of an acquired image to find a potential match location, (b) correlates a rotated reference image having the first spatial resolution at a particular degree of rotation within the first search region of interest to find a potential match location, (c) selects the potential match location and the particular degree of rotation corresponding to the highest correlation value, (d) increases the spatial resolution of the reference image at the particular degree of rotation to generate a new reference image and correlating the new reference image within a second search region of interest centered at the selected potential match location, (e) selects an updated potential match location corresponding to a location having the highest correlation value that is completely within the search region of interest, (f) repeats steps (d) and (e) for all available resolutions for the reference image, and (g) selects a match location and orientation of a reference image within the acquired image corresponding to the location having the highest correlation value.

BRIEF DESCRIPTION OF THE DRAWINGS

In the drawings, wherein like reference letters and numerals indicate corresponding elements throughout the several views:

FIG. 8 illustrates a set of processing operations performed in implementing a normalized gray scale pattern find process in accordance with the present invention.

DETAILED DESCRIPTION

Figure 1:
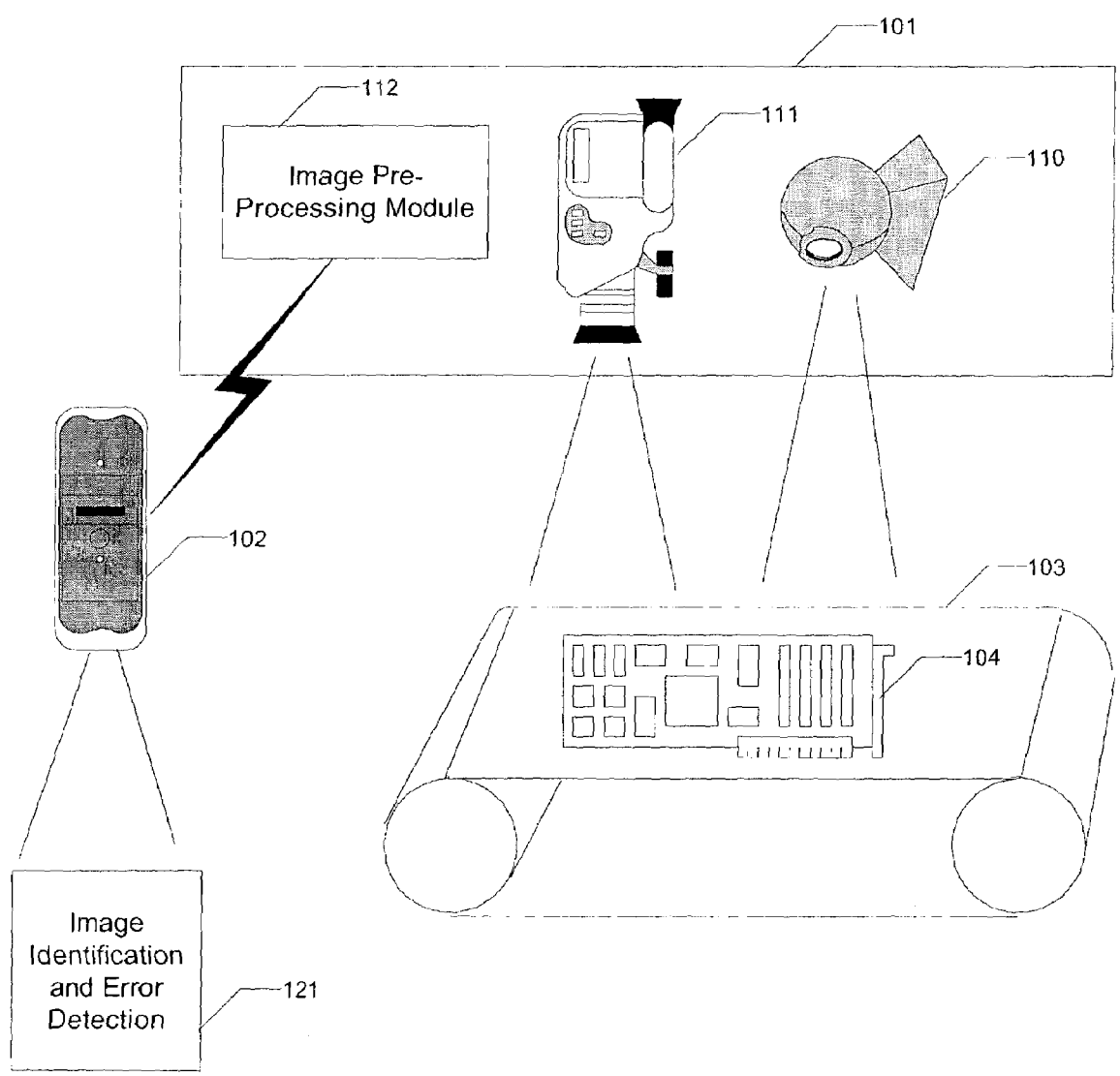
FIG. 1 illustrates a system for providing a machine vision system in accordance with the present invention.

The present invention relates to a system and method for data processing of images within a machine vision system, and more specifically to a system and method for utilizing a normalized gray scale pattern find within a machine vision system. FIG. 1 illustrates a system for providing a machine vision system in accordance with the present invention. The machine vision system includes a image input device, such as a video camera 111 or digital image camera 110, that are connected to a data processing system 102. The vision system is typically used to obtain images of objects of interest such as parts 104 that are being manufactured on an assembly line 103. The image input device 111-110 obtains an image of the object of interest 104 that is first pre-processed 112 within an embedded processing system before being further processed within the computing system 102 as needed. The present invention related to the pre-processing that occurs within the embedded processing system 112. Specifically, the present invention related to the implementation of a normalized gray scale pattern find within a particular machine vision system.

Figure 2A:
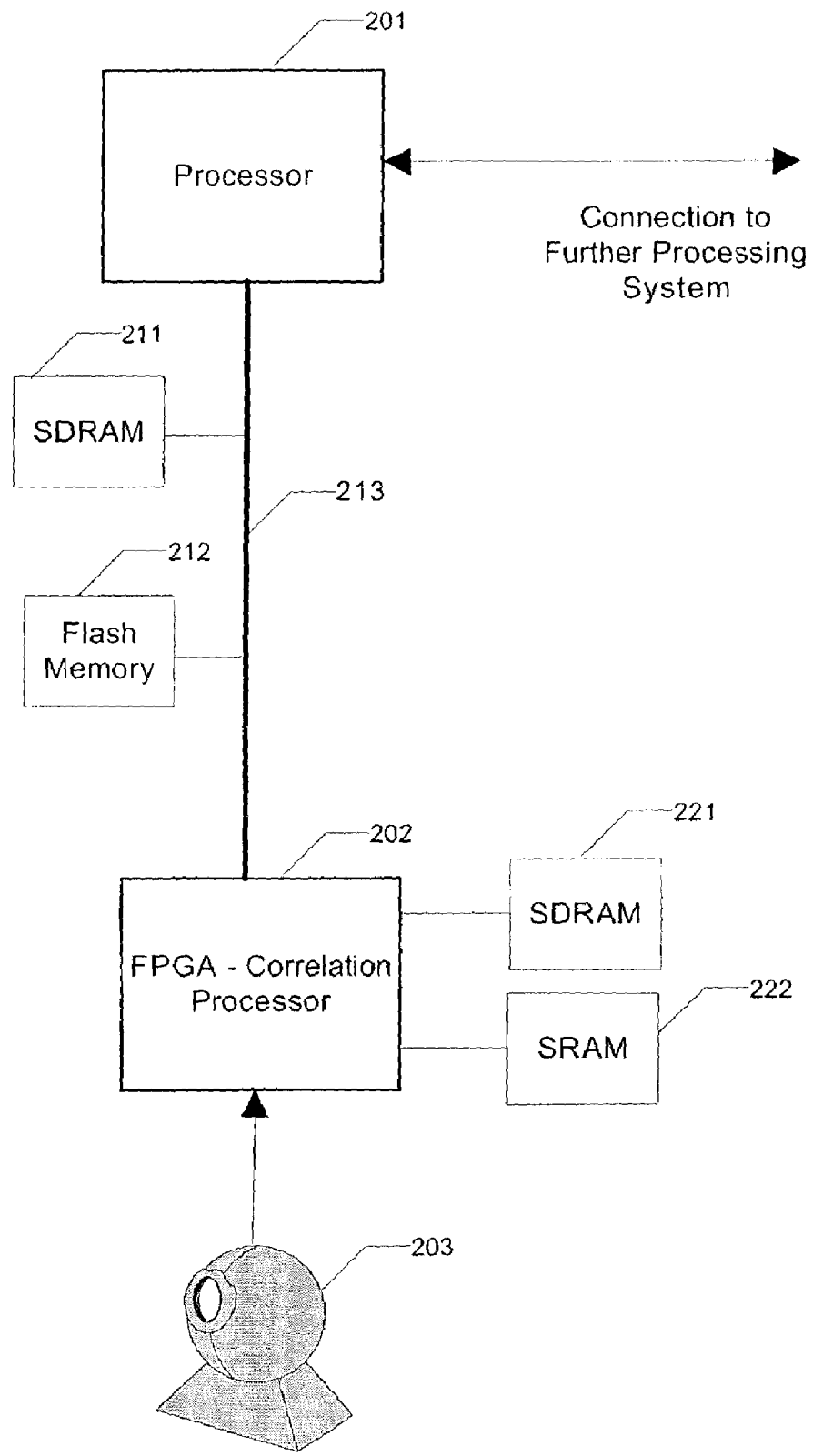
FIG. 2*a* illustrates an embodiment of a special purpose computing system for providing a machine vision system in accordance with the present invention.

FIG. 2 illustrates an embodiment of a special purpose computing system for providing a machine vision system in accordance with the present invention. Typically, a special purpose computing system is used to perform the pre-processing of acquired images that are to be scanned to compare the acquired image with a previously generated and stored image of the item of interest.

The special purpose computing system includes a main processor 201, a correlation processor 202, and memory 211-212 which all communicate over a system bus 213. The memory may consist of RAM of different types including synchronous dynamic RAM (SDRAM) 211 and mass storage that may consist of flash memory 212. Of course, one skilled in the art will recognize that various memory architectures may be utilized to construct the present invention as recited within the attached claims.

Figure 2B:
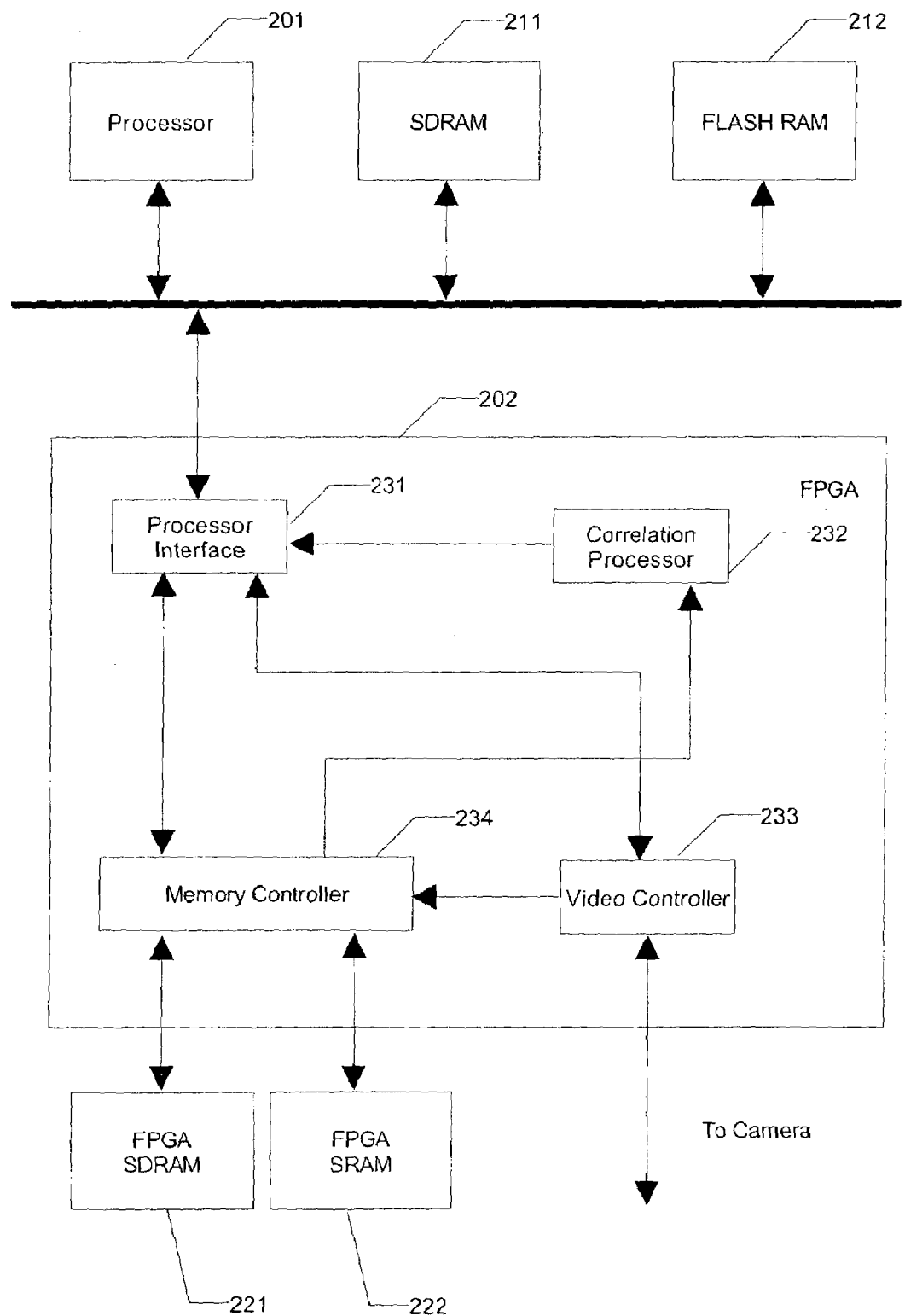
FIG. 2*b* illustrates an embodiment of a special purpose computing system for providing a FPGA implemented machine vision system in accordance with the present invention.

The correlation processor possesses its own memory system which may include synchronous dynamic RAM (SDRAM) 221 and SRAM 222 to store the data needed for the correlation processing that is part of the pre-processing subsystem. The correlation processor is also electrically connected to an image generation device 203, such as a digital camera. The correlation processor may be constructed from a custom electronic device made using a Field Programmable Gate Array (FPGA) An example of such a FPGA is shown in FIG. 2b.

During the operation of the pre-processing subsystem, an acquired image is generated by the camera 203 and passed into the correlation processor 202. This processor 202 may store part or all of the acquired image into its memory 221-222 for use in its processing. As is discussed later in more detail in relation to FIG. 4, the correlation processor will correlate a small reference image with the larger acquired image in an attempt to locate where within the larger image the reference image is located. This computationally intensive process occurs within the correlation processor 202. As is also discussed in reference to FIG. 6, the resolution of the acquired image and the reference image may be varied to minimize the processing needed during the pre-processing operations.

The correlation processor 202 receives the reference image from the main processor 201 and passes the results of the correlation process to the main processor 201 for additional processing. The main processor 201 also instructs the correlation processor 202 where in the acquired image the correlation operation is to occur. The main processor 201 receives the generated correlation image that may be searched for a peak value that corresponds to the location of the best match between the reference image and the processed portion of the acquired image. The main processor 201 may also instruct the correlation processor 202 to use a lower resolution image to speed up the processing. In such a case, the acquired image must be reduced in resolution either by averaging pixel values to create a lower resolution acquired image or by sub-sampling the acquired image to create the lower resolution acquired image. In either case, a reference image having the same spatial resolution as the acquired resolution is needed before the correlation operation occurs.

The main processor 201 may instruct the correlation processor to correlate the acquired image against a series of references where each of the references possess a different spatial resolution. In such a case, the entire acquired image may be correlated using the lowest resolution image for the reference image to find one or more possible match locations. Once these possible match locations are found, smaller regions of the acquired image may be correlated using higher resolution reference images. In such an arrangement, the vast majority of the acquired image will be processed at the lowest resolution, thus requiring the minimum amount of processing to occur. The highest resolution references may be used only over small areas where there is high confidence that the match is going to occur. As such, a processing system may be constructed that uses high resolution references to determine the final match location without the need to process the acquired image at the highest resolution.

The interaction between the main processor 201 and the correlation processor 202 occurs in this manner until the best match location is determined. The best match location and the acquired image may then be passed to a general processing system for further processing as needed. In many vision systems, the task of the pre-processing system is to determine the location of a known reference region in a larger image. Once the location, orientation, and scale of the reference is obtained, then further processing may occur. For example, a reference mark may be placed on a printed circuit board to be processed by a vision system as it passes on an assembly line. The vision system acquires an image of a printed circuit board as it passes through the vision system's field of vision. If the vision system can locate the reference mark in the acquired image, the vision system may then look for other components at known locations relative to the reference mark within the acquired image. Using a reference mark to register the item being scanned within the acquired image will greatly simplify the vision processing and inspection processing to occur.

FIG. 2b illustrates an embodiment of a special purpose computing system for providing a FPGA implemented machine vision system in accordance with the present invention. This example embodiment illustrates the modules within the FPGA correlation processor 202 within a processing system if FIG. 2b. The FPGA correlation processor 202 includes a processor interface module 231, a correlation processor 232, a memory controller module 233 and a video controller 234.

The processor interface module 231 handles both command and data transfers between the processor 201 and the other blocks of the FPGA 202. The video controller module 234 handles image transfers from the camera to memory controller module 233. When the processor 201 instructs the FPGA 202 to capture an image the FPGA 202 waits for a valid frame from the camera and then begins transferring image data to the memory controller 233 for each valid line.

The memory controller module 233 handles transfers from the FPGA SRAM 222 to the processor 201. This operation allows the image to be displayed for a user. The memory controller module 233 also handles transfers from the correlation processor module 232 for normalized grayscale correlation.

The memory controller module 233 handles transfers to the FPGA SDRAM 221 from the video controller module 234. This operation allows the storage of the image from the camera. The memory controller module 233 also handles transfer to the FPGA SDRAM 221. This operation allows double buffered images to be moved for processing.

The memory controller module 233 handles transfers from the FPGA SDRAM 221 to the processor 201 and the correlation processor module 232 for normalized grayscale correlation.

The memory controller module 233 handles transfers to the FPGA SDRAM 221 from the video controller module 234. This operation allows the storage of a double buffered image from the camera. The memory controller module handles transfers to the processor 201 to allow the storage of the reference pattern image along with all the rotated and decimated reference pattern images.

Prior to capturing an image from the camera the processor 201 instructs the memory controller module 233 to store the image in either just FPGA SRAM 222 or also the FPGA SDRAM memory 221. The processor 201 also provides the memory controller module 233 with starting pointers for the image buffers. During an image transfer from the camera the memory controller module 233 accepts video data from the video controller module 234 and stores it in the specified memory buffer(s).

Prior to starting the correlation process the processor 201 provides the memory controller module 233 with pointers to the location of the appropriate reference pattern in the FPGA SDRAM memory 221 and the current image in the FPGA SRAM 222.

The correlation processor module 232 consists of both multipliers and adders allowing for hardware assist in the calculation of the various terms for the normalized grayscale correlation equation (NGC). The NGC equation is:

$R = \text{Numerator}/\text{Denominator}$ where $\text{Numerator} = (N*\Sigma(I*R)) - (\Sigma I * \Sigma R)$ $\text{Denominator} = \{(N*\Sigma I^2 - (\Sigma I)^2) * (N*\Sigma R^2 (\Sigma R)^2)\}^{1/2}$ $N$ = number of pixels in reference template $I$ = inspection image $R$ = reference pattern The correlation processor calculates 3 terms for the NGC equation:

$\Sigma(I*R)$ $\Sigma I^2$ and $\Sigma I$

Prior to running an inspection the processor calculates the 2 reference pattern items:

$\Sigma R$ and $N*\Sigma R^2 - (\Sigma R)^2$

The processor 201 provides the memory controller module 233 with pointers to the start of the appropriate reference pattern and the location in the search ROI to perform the correlation. The memory interface to both the FPGA SDRAM 221 and SRAM 222 is 16-bits wide and each image grayscale value is only 8-bits wide. The image is stored in the FPGA SRAM memory 222 so that each image row starts on an even 16-bit word boundary. The processor also stores the various reference patterns in the SDRAM 221 so that they are aligned on 16-bit boundaries. This allows the correlation processor to simultaneously calculate the 3 terms for two adjacent NGC correlation values. At the completion of the correlation process the correlation processor provides the processor with 6 terms, 3 for the even NGC value and 3 for the odd NGC value.

Figure 3:
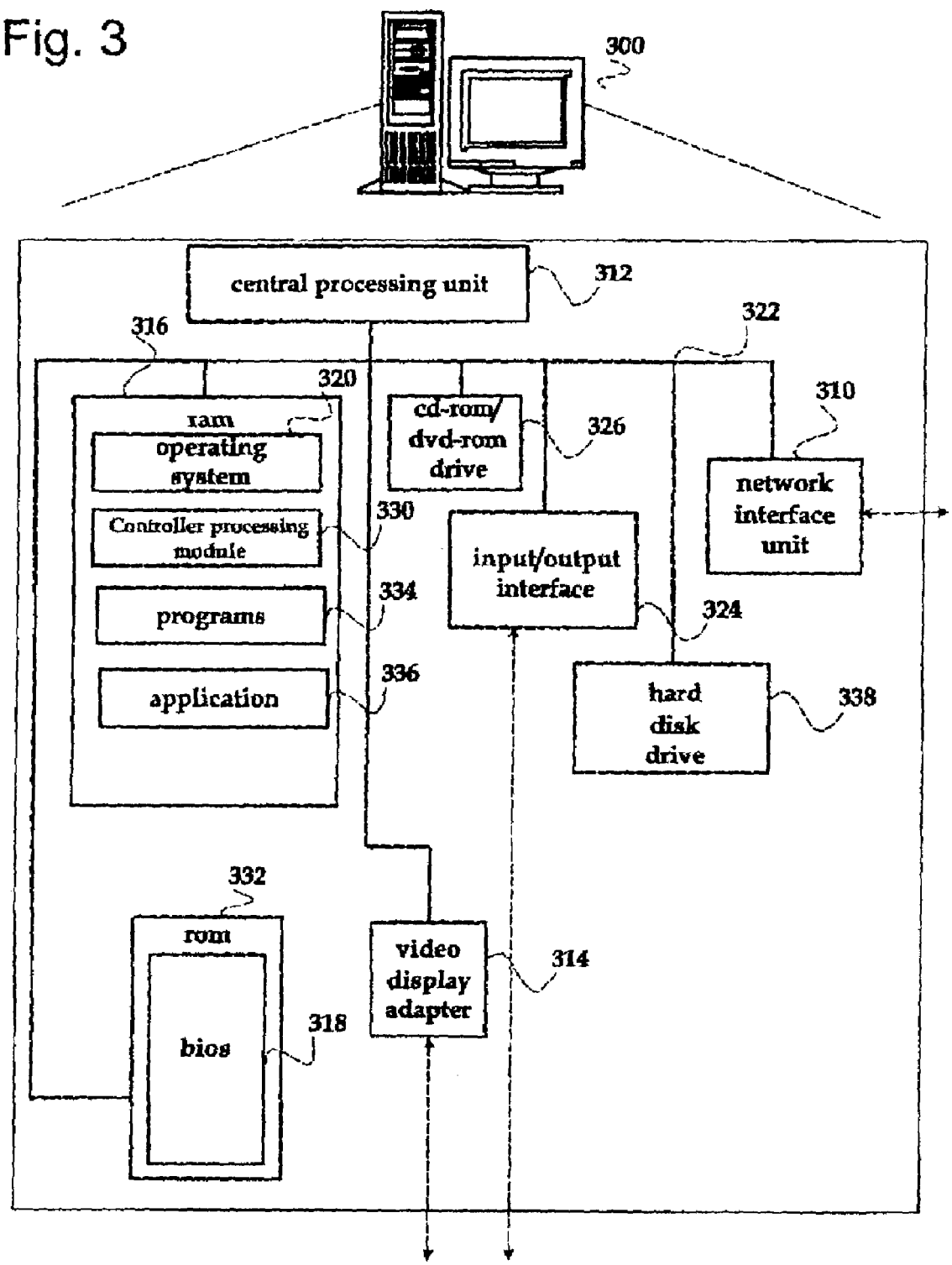
FIG. 3 illustrates an embodiment of computing systems used as part of a system providing a machine vision system in accordance with the present invention.

FIG. 3 illustrates an embodiment of a general purpose computing systems used as part of a system for configuring an optical circuit in accordance with the invention. As shown in FIG. 3, the master controller processing system 300 is connected to a WAN/LAN 100, or other communications network, via network interface unit 310. Those of ordinary skill in the art will appreciate that network interface unit 310 includes the necessary circuitry for connecting a processing system to WAN/LAN 200, and is constructed for use with various communication protocols including the TCP/IP protocol. Typically, network interface unit 310 is a card contained within the processing system 300.

The processing system 300 also includes processing unit 312, video display adapter 314, and a mass memory, all connected via bus 322. The mass memory generally includes RAM 316, ROM 332, and one or more permanent mass storage devices, such as hard disk drive 328, a tape drive, CD-ROM/DVD-ROM drive 326, and/or a floppy disk drive. The mass memory stores the operating system 320 for controlling the operation of master controller processing system 300. It will be appreciated that this component may comprise a general purpose server operating system as is known to those of ordinary skill in the art, such as UNIX, LINUX™, MAC OS®, or Microsoft WINDOWS NT®. Basic input/output system ("BIOS") 318 is also provided for controlling the low-level operation of master controller processing system 300.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data for providing a master controller processing and network development. More specifically, the mass memory stores applications including master controller processing module 330, programs 334, and other applications 336. Processing module 330 includes computer executable instructions which, when executed by master controller processing system 300, performs the logic described above.

The processing system 300 also comprises input/output interface 324 for communicating with external devices, such as a mouse, keyboard, scanner, or other input devices not shown in FIG. 3. Likewise, master controller processing system 300 may further comprise additional mass storage facilities such as CD-ROM/DVD-ROM drive 326 and hard disk drive 328. Hard disk drive 328 is utilized by master controller processing system 300 to store, among other things, application programs, databases, and program data used by master controller processing module 330. For example, customer databases, product databases, image databases, and relational databases may be stored. The operation and implementation of these databases is well known to those skilled in the art.

One skilled in the art may readily recognize that a processing system 300 may possess only a subset of the components described above without deviating from the spirit and scope of the present invention as recited within the attached claims. For example, in one embodiment, the mass storage devices for the master controller processing system 300 may be eliminated with all of the data storage being provided by solid state memory. Programming modules may be stored in ROM or EEPROM memory for more permanent storage where the programming modules consist of firmware that is loaded or updated infrequently. Similarly, as an embedded processing system, many of the user interface devices such as input devices and display devices may also not be present.

Figure 4:
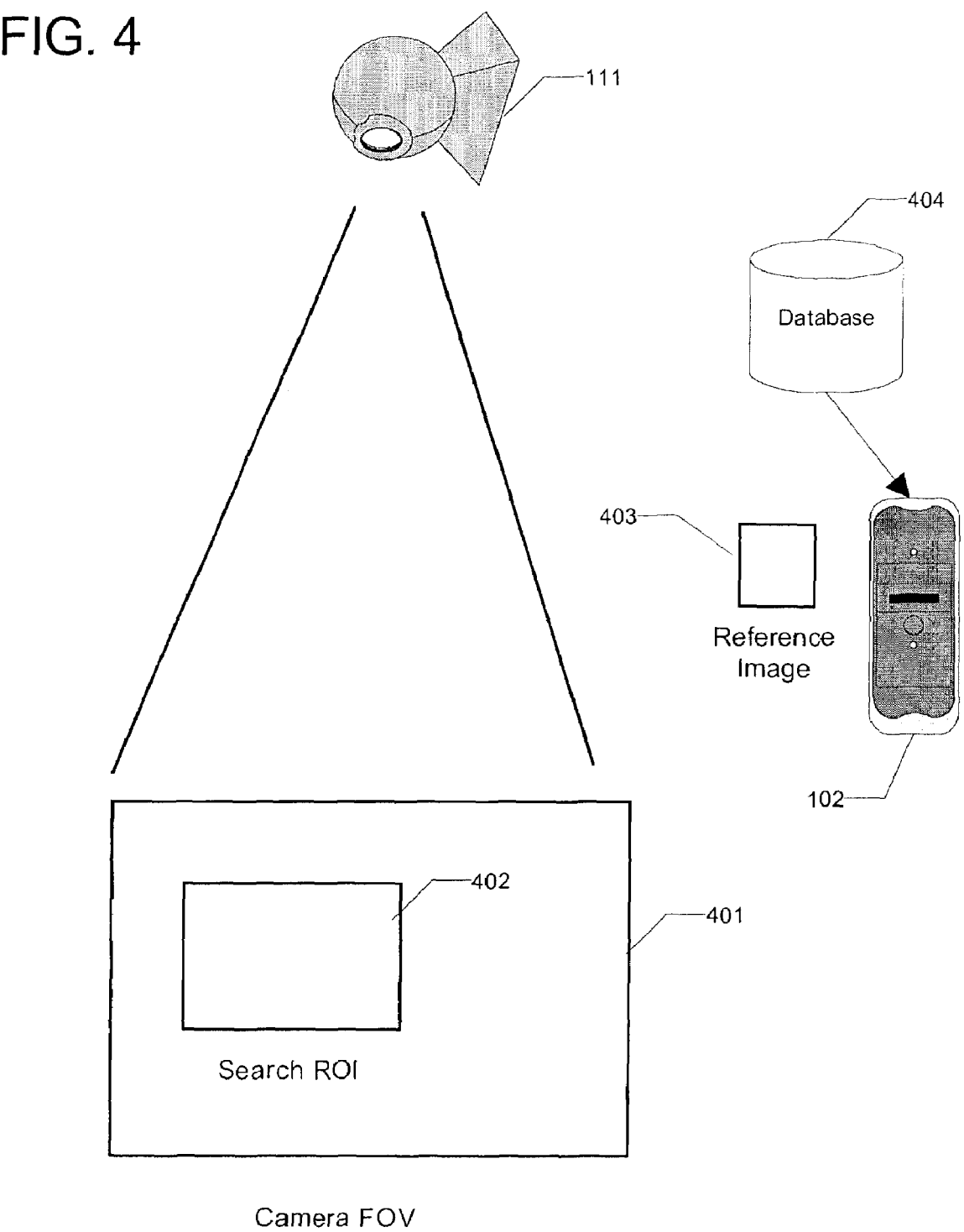
FIG. 4 illustrates an example machine vision system attempting to locate a reference image within an image from a camera field of view in accordance with an embodiment of the present invention.

FIG. 4 illustrates an example machine vision system attempting to locate a reference image within an image from a camera field of view (FOV) in accordance with an embodiment of the present invention. As discussed above, an acquired image 401 is typically much larger than the reference image 403 that is to be located within the acquired image 401. As is also discussed above, the processing system may wish to restrict the search region of interest (ROI) to be an area at a known location which is of interest. When beginning to examine the acquired image 401, the search ROI 402 may correspond to the entire acquired image 401. Once information is determined to limit the search ROI 402 to a smaller area, less processing is needed to perform a correlation or matching operation.

Typically, the reference image 403 is generated well before the acquired image is obtained. The reference image 403 represents an image that is expected to be found within the acquired image 401. The task of the vision system is to find where within the acquired image 401 the reference image is located, and to identify any orientation information that is needed to define the location of objects whose position is know relative to the reference image.

Figure 5:
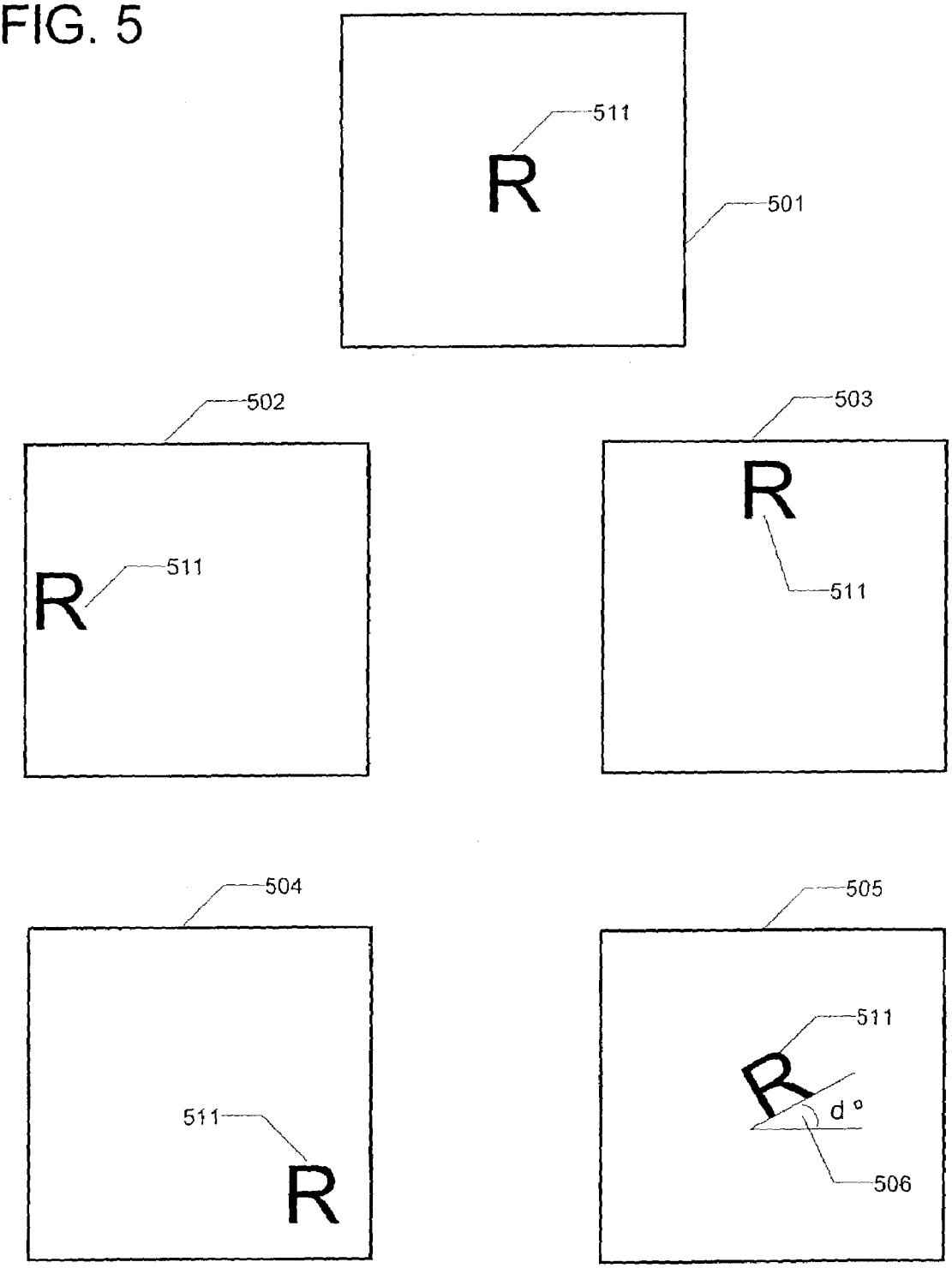
FIG. 5 illustrates a series of possible reference image arrangements when found in the camera image in accordance with the present invention.

FIG. 5 illustrates a series of possible reference image arrangements when found in the acquired image in accordance with the present invention. In this example, consider a reference item 511, which corresponds in this example to a letter "R", to be located within five (5) different search ROIs of an acquired image. In an ideal case, the reference image would appear perfectly centered within the search ROI as shown in ROI 501. The reference R 511 is located at the center position and is oriented parallel to each of the sides of the ROI 501.

More typically, the reference item R 511 is usually displaced in either the x-direction as shown in ROI 502, the y-direction as shown in ROI 503, or both the x-direction and y-direction as shown in ROI 504. These positional offsets arise from the fact that the acquired image does not always know the exact location of an object that passes within the camera FOV. In an even more complicated situation that arises with regularity, a reference item 511 may be rotated a number of degrees (d°) relative to the expected orientation 506 in addition to the positional translation discussed above. The correlation operation must take all of these examples into account when attempting to locate a reference item 511 within a search FOV 501-505.

Figure 6:
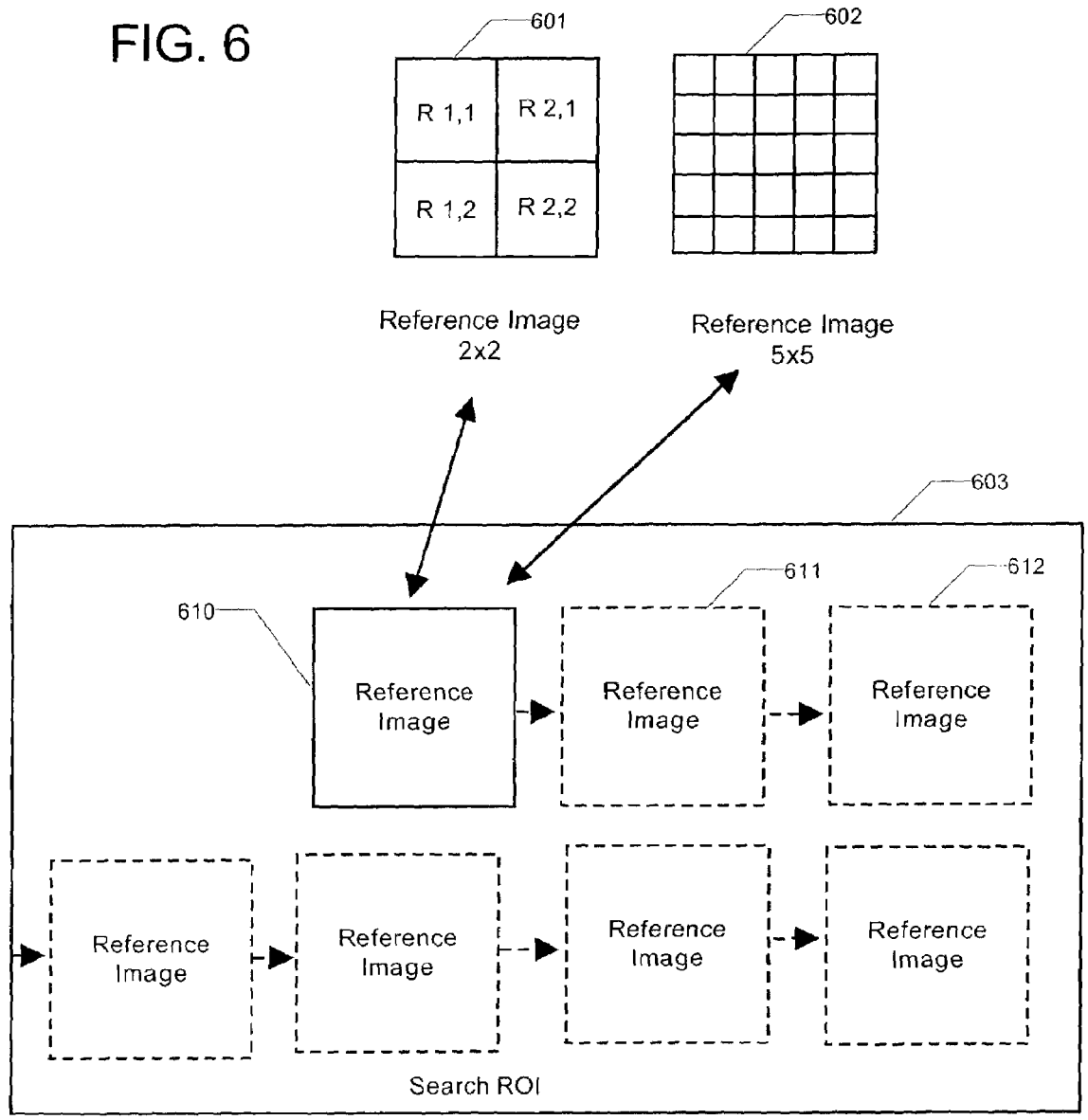
FIG. 6 illustrates a correlation of a reference image with a larger image at various decimation levels in accordance with an example embodiment of the present invention.

FIG. 6 illustrates a correlation of a reference image with a larger image at various decimation levels in accordance with an example embodiment of the present invention. The correlation operation that is to be performed as part of the above matching operation requires that the pixel values of the reference image 601-602 be correlated with corresponding pixels in a search ROI 603 for each possible location of the reference image 601-602 within the search ROI 603. At each possible location within the search ROT 603, the correlation value at that location is defined as:

$r$=Numerator/Denominator where

Numerator=$(N^*\Sigma(I^*R))-(\Sigma I^*\Sigma R)$

Denominator=$\{(N^*\Sigma I^2-(\Sigma I)^2)^*(N^*\Sigma R^2-(\Sigma R)^2)\}^{1/2}$ N=number of pixels in reference template I=inspection image R=reference template From the above formula it is easily seen that calculating a single correlation value requires numerous multiplications, additions, subtractions, divides, and square-roots. This needs to be repeated as the template is slid around the entire search ROI. The number of correlation results is (m2−m1+1)*(n2−n1+1) where the search ROI is m2×n2 and the object ROI is m1×n1. As an example assume that the m2=250, n2=200 (250×200), m1=100, and n1=100 (100×100) then the total number of correlation values is 15251. This operation requires:

305,106,257 multiples;
457,550,000 adds;
45,753 subtracts;
15,251 divides; and
15,251 square-roots.

Clearly, as the resolution required to represent the reference image increases, the amount of computations needed increases significantly. Because of this fact and because the above value is calculated for each possible location 610-612 of the reference image within the search ROI, a need exists to keep the search ROI as small as possible as the resolution of the reference image increases. The example embodiment shown in FIG. 6 illustrates reference images having a 2×2 and a 5×5 resolution. In the preferred embodiment, the references images may also include m×n sized reference images where the dimensions of the images are $10 \leq m \leq 20$ and $10 \leq n \leq 20$. The example discussed above applies to all resolutions of the reference image without deviating from the spirit and scope of the present invention as recited within the attached claims.

One solution to attempt to minimize the total amount of processing required when performing the above correlation operations is to correlate a reference image that uses a low resolution 601 against an a larger search ROI to find locations where possible matches occur. Once these locations are found, reference images that correspond to the reference item at higher resolutions may be correlated over a much smaller search ROI centered about the previously found match location. Presumably the match location will remain within the much smaller ROI when the higher resolution reference image is used. Depending upon the range of resolutions used, the above find a best match location within an increasingly smaller search ROI may be found as the search process narrows in upon the best match location.

Figure 7:
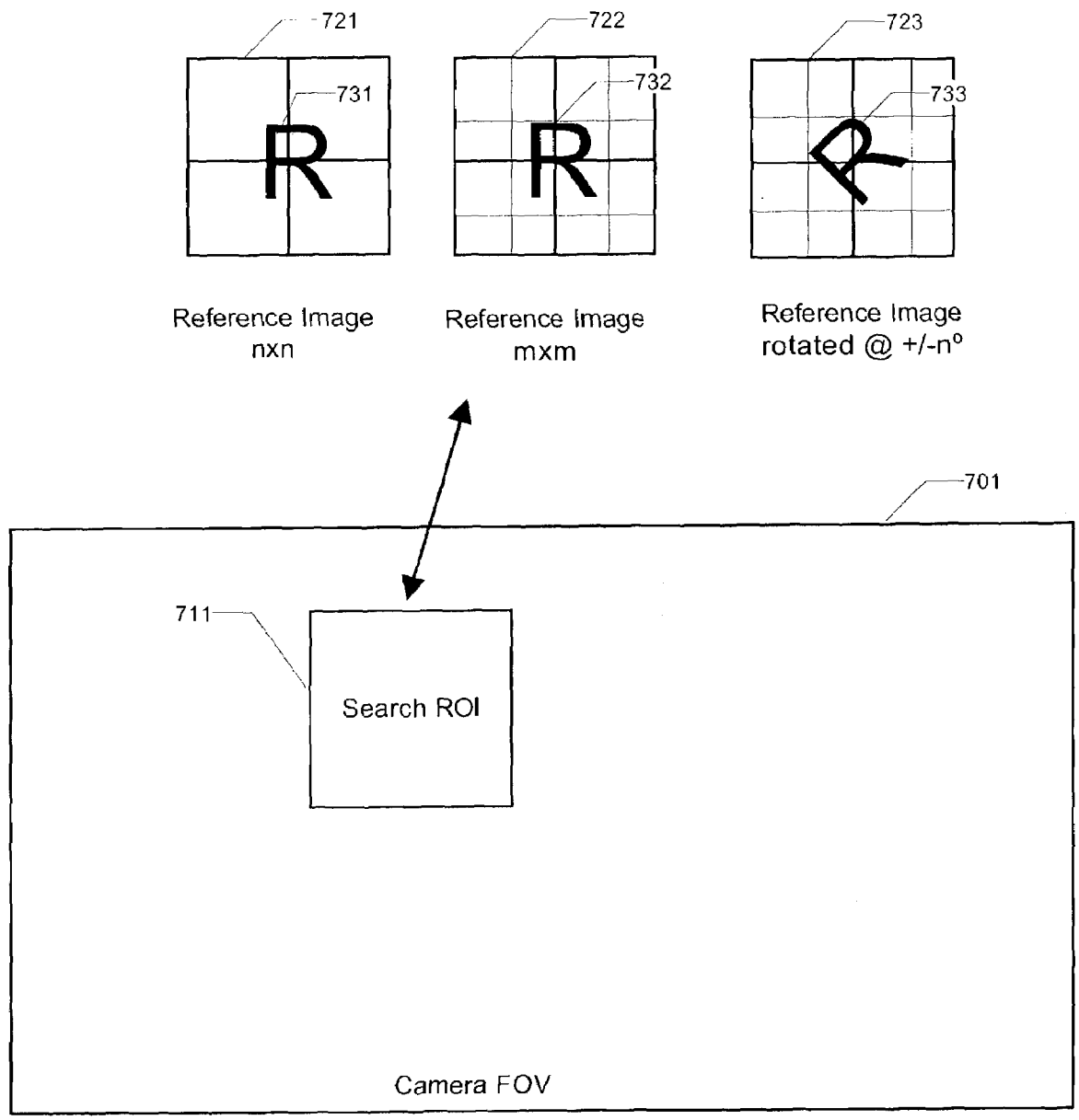
FIG. 7 illustrates a processing sequence of reference images utilized in a normalized gray scale pattern find process for use in locating a reference image within a larger image in accordance with an embodiment of the present invention.

FIG. 7 illustrates a processing sequence of reference images utilized in a normalized gray scale pattern find process for use in locating a reference image within a larger image in accordance with an embodiment of the present invention. When a vision system processes an acquired image to find a location for a reference mark within the acquired image, the processing begins with a reference image 721 that possesses the smallest spatial resolution, i.e. the lowest resolution image, to allow the search ROI 711 to be the largest area within the camera FOV 701. As such, the lowest resolution reference image is cross-correlated with the lowest resolution search area ROI, thus permitting a larger area of the acquired image to be searched in a minimal amount of time. This reference image 721 will not provide the most accurate position result for the matching operations as the detail of the reference mark 731 within the reference image 721 does not possess enough detail within the pixels to accurately match the reference mark 731 with pixels within the acquired image.

Once a possible match location corresponding to the best correlation at the lowest resolution is identified, a higher resolution reference image 722 may be used over a smaller search ROI 711. This additional searching is performed about a region centered at the above possible match location. This higher resolution reference image 722 provides a more detailed representation of the reference mark 732 that will provide a better match result as well as better spatial registration for the position of the reference mark 732 within the search ROI 711. The processing at higher resolutions for the reference image may also be repeated using a reference image 723 that contains a reference mark 733 that has been rotated with respect to the coordinates of the reference image 723. This rotation of the reference mark 733 will account for any rotation present within the acquired image between the item of interest and the coordinates of the pixels in the acquired image.

The orientation of the item of interest within the coordinates of the acquired image is needed in addition to the location of the reference mark 723 within the acquired image if a vision system is to examine the item of interest for components known to be located at a position defined relative to the position of the reference mark. As such, the match location having the highest correlation value is located for each reference image at a particular amount of rotation. The correlation value having the overall highest value is used to define the orientation where the amount of rotation of the item of interest is said to be equal to the amount of rotation of the reference mark 733 within the corresponding reference image 723.

FIG. 8 illustrates a set of processing operations performed in implementing a normalized gray scale pattern find process in accordance with the present invention. The process of finding a reference mark within an acquired image 801 begins with a processing operation 811 in which a reference image having the smallest resolution (n×n) is correlated over the search ROI 802 at the same resolution. The highest correlation value generated in this process corresponds to a potential match location. If multiple peak locations are identified, each location may be considered as a possible match location.

When the above searching is performed, a checkerboard search is performed in which only one half of the correlation values are processed. The best match location is identified in the correlation values. Because correlation values adjacent to this location have not been calculated, the adjacent correlation values are computed for all locations around a peak correlation value. A new best match is determined and the process repeats until a peak correlation value is found that possesses adjacent points that all possess a lower correlation value. This location is found to be the best match location.

The smallest reference image resolution is determined when the reference image is selected and generated. An example of a system for selecting a range of image resolutions for a reference image within a Normalized Gray Scale Pattern Find Process may be found within a commonly assigned and concurrently filed U.S. patent application, titled, "SYSTEM AND METHOD FOR DETERMINING A IMAGE DECIMATION RANGE FOR USE IN A MACHINE VISION SYSTEM", Ser. No. 10/337,525, filed Jan. 6, 2003. This application is hereby incorporated by reference as if recited in its entirety herein. Another example of a system for selecting proper reference images for use within a Normalized Gray Scale Pattern Find Process may be found within a commonly assigned and concurrently filed U.S. patent application, titled, "SYSTEM AND METHOD FOR PERFORMING ROTATIONAL TESTING FOR A REFERENCE IMAGE USED IN A NORMALIZED GRAYSCALE PATTERN FIND SYSTEM", Ser. No. 10/337,518, filed Jan. 6, 2003. This application is also incorporated by reference as if recited in its entirety herein.

The processing repeats in processing operation 812 in which the same search ROI 802 is searched using reference images using the above described checkerboard processing as the resolution of the reference image is increased. Once the highest resolution is processed the processing continues around the possible match location using images in which the reference mark has been rotated +/−m° of rotation. The highest correlation value of the three searches are then compared with the highest of the three selected as the best match.

Next, the processing continues with processing operation 813 in which the search is repeated using a reference image having a 2n×2n resolution having the amount of rotation previously identified as producing the best match. This search in processing operation 813 is performed over a significantly smaller search ROI 802 centered around the prior best match location. A new best match location is identified. If the best match location is found to be on the edge of the search ROI, the search ROI is expanded in the direction of the edge until the best match location corresponding to the location having the highest generated correlation value is completely within the search ROI. In a preferred embodiment, the search ROI for these search operations corresponds to a 6×5 pixel area centered about the match location in order to minimize the number of correlation values that needs to be generated for a given reference image.

Once an updated match location is determined, processing operation 814 repeats the processing of operation 813 using the next highest decimation level for the reference image (ie. 4n×4n, 8n×8n, etc.). These reference images also possess the same mount of rotation previously identified as producing the best match in the earlier searches. Operation 814 repeats the processing for successively increasing reference image resolutions to find the best match location for a reference image at the highest reference image resolution. Once again, the processing initially uses a 6×5 search ROI in this processing and expands the area in the direction of an edge if the peak correlation value is found on the edge of the 6×5 search ROI.

Once the processing in operation 814 has reached the highest reference image resolution, the processing continues in operation 815. This operation 815 repeats the correlation processing around a 6×5 search ROI using a reference image having an amount of rotation that is +/−1° from the amount of rotation used in the above processing. The three highest correlation values from these three operations are compared. If the highest of the three correlation values is the center of the three amounts of rotation, the processing ends and the location of the match location is determined at this location and possesses an orientation having an amount of rotation corresponding to the reference image used to generate the highest correlation value. If the highest of the three correlation values is not the center of the three amounts of rotation, the processing is repeated by shifting the amount of rotation by 1° of rotation. This processing 815 is repeated until the highest correlation value is the center of the three correlation values and a result has been generated.

Figure 9:
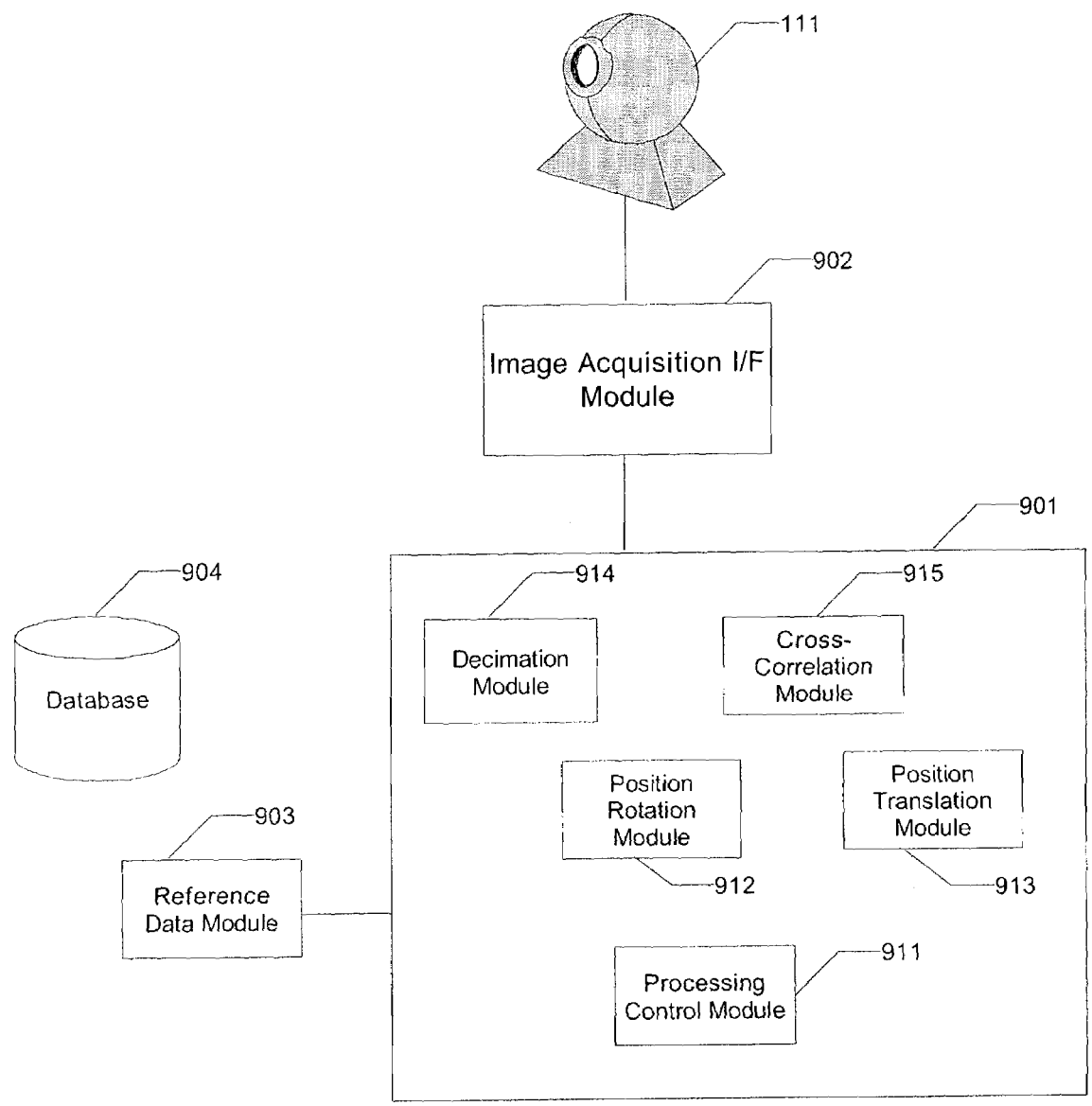
FIG. 9 illustrates a set of processing modules used within an example embodiment of a machine vision system in accordance with the present invention.

FIG. 9 illustrates a set of processing modules used within an example embodiment of a machine vision system in accordance with the present invention. The vision system according to the present invention is used to locate a position of a reference image and its corresponding orientation using a Normalized Gray Scale Pattern Find Process described above. The processing system 901 includes a processing control module 911, a position rotation module 912, position translation module 913, an image decimation module 914, and an image cross-correlation module 915. The processing module 901 is connected to a reference image data module 903 that obtains reference images used in the processing system from a database of reference images 904.

The reference image data module 903 is used to acquire the reference image at its highest resolution and to select the area around the reference item that forms the high resolution reference image. The high resolution reference image is provided by the reference image data module 903 to the processing module 901 for use in its processing modules. These reference images are stored in an image database 904 once generated for repeated use as needed.

Within the processing module 901, the processing control module 911 receives user input commands to begin the processing of a reference image. This module 911 coordinates the operation of the other modules within the processing module 901 during their operation. The results of the processing, which correspond to match locations and corresponding orientation of a reference mark within an acquired image, may be passed by the processing control module 911 to other processing systems for further use in a Normalized Gray Scale Pattern Find Process described above.

The position rotation module 912, the position translation module 913, and the image decimation module 914 are used in the processing of the sequence of reference images to correlate the particular reference image of interest against a particular search ROI as described above. The image cross-correlation module 915 correlates the acquired image within the search ROI with the reference image of interest during a particular processing operation to determine if the best match location for a reference mark within the acquired image using the Normalized Gray Scale Pattern Find Process as described above.

The embodiments described herein are implemented as logical operations performed by a computer. The logical operations of these various embodiments of the present invention are implemented (1) as a sequence of computer implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules.

While the above embodiments of the present invention describe a system and method for utilizing a normalized gray scale pattern find within a machine vision system, one skilled in the are will recognize that the use of the processing system discussed above are merely example embodiments of the present invention. As long as a machine vision system is used to normalized gray scale pattern find, the present invention to would be useable in other data processing systems. It is to be understood that other embodiments may be utilized and operational changes may be made without departing from the scope of the present invention as recited in the attached claims.

As such, the foregoing description of the exemplary embodiments of the invention has been presented for the purposes of illustration and description. They are not intended to be exhaustive or to limit the invention to the precise forms disclosed. Many modifications and variations are possible in light of the above teaching. It is intended that the scope of the invention be limited not with this detailed description, but rather by the claims appended hereto. The present invention is presently embodied as a method, apparatus, and a computer data product containing a computer program for utilizing a normalized gray scale pattern find within a machine vision system. Since many embodiments of the invention can be made without departing from the spirit and scope of the invention, the invention resides in the claims hereinafter appended.

What is claimed is:

1. A system for utilizing a normalized gray scale pattern find within a machine vision system, the system comprising:
    (a) means for correlating a reference image having a first spatial resolution having no particular degree of rotation within a first search region of interest of an acquired image to find a potential match location;
    (b) means for correlating a rotated reference image having the first spatial resolution at a particular degree of rotation within the first search region of interest to find a potential match location;
    (c) means for selecting the potential match location and the particular degree of rotation corresponding to the highest correlation value;
    (d) means for increasing the spatial resolution of the reference image at the particular degree of rotation to generate a new reference image and correlating the new reference image within a second search region of interest centered at the selected potential match location;
    (e) means for selecting an updated potential match location corresponding to a location having the highest correlation value that is completely within the search region of interest;
    (f) means for repeating steps (d) and (e) for all available resolutions for the reference image; and
    (g) means for selecting a match location and orientation of a reference image within the acquired image corresponding to the location having the highest correlation value.

2. The system according to claim 1, wherein the first spatial resolution corresponds to a minimum decimated resolution for a reference image generated from a high resolution reference image.

3. The system according to claim 2, wherein the increased spatial resolution of a reference image corresponds to the next highest decimated image resolution for a reference image generated from a high resolution reference image.

4. The system according to claim 2, wherein processing within the correlating means performs the processing using a checkerboard search when the processing the first spatial resolution.

5. The system according to claim 4, wherein the processing within the correlating means performs the correlation operation to fill in missing correlation values around the potential match location.

6. The system according to claim 1, wherein the first search region of interest corresponds to the entire acquired image.

7. The system according to claim 1, wherein the second search region of interest corresponds to a 6×5 pixel region of interest center around the potential match location with the search region increasing as necessary to completely enclose the peak correlation value.

8. A system for utilizing a normalized gray scale pattern find within a machine vision system, the system comprising:
an image acquisition interface module for obtaining an acquired image from an image capture device;
an image reference data module for providing a set of reference modules for use in locating a reference mark within the acquired image;
an image processing module for correlating the set of reference images within a set of search regions of interest to find the best match location;
wherein the image processing module uses a normalized gray scale pattern find process
wherein the image processing module comprises;
(a) means for correlating a reference image having a first spatial resolution having no particular degree of rotation within a first search region of interest of an acquired image to find a potential match location;
(b) means for correlating a rotated reference image having the first spatial resolution at a particular degree of rotation within the first search region of interest to find a potential match location;
(c) means for selecting the potential match location and the particular degree of rotation corresponding to the highest correlation value;
(d) means for increasing the spatial resolution of the reference image at the particular degree of rotation to generate a new reference image and correlating the new reference image within a second search region of interest centered at the selected potential match location;
(e) means for selecting an updated potential match location corresponding to a location having the highest correlation value that is completely within the search region of interest;
(f) means for repeating steps (d) and (e) for all available resolutions for the reference image; and
(g) means for selecting a match location and orientation of a reference image within the acquired image corresponding to the location having the highest correlation value.

9. The system according to claim 8, wherein the first spatial resolution corresponds to a minimum decimated resolution for a reference image generated from a high resolution reference image and the increased spatial resolution of a reference image corresponds to the next highest decimated image resolution for a reference image generated from a high resolution reference image.

10. The system according to claim 8, wherein the first search region of interest corresponds to the entire acquired image.

11. The system according to claim 8, wherein the second search region of interest corresponds to a 6×5 pixel region of interest center around the potential match location.

12. A method for utilizing a normalized gray scale pattern find within a machine vision system, the method comprising:
(a) correlating a reference image having a first spatial resolution having no particular degree of rotation within a first search region of interest of an acquired image to find a potential match location;
(b) correlating a rotated reference image having the first spatial resolution at a particular degree of rotation within the first search region of interest to find a potential match location;
(c) selecting the potential match location and the particular degree of rotation corresponding to the highest correlation value;
(d) increasing the spatial resolution of the reference image at the particular degree of rotation to generate a new reference image and correlating the new reference image within a second search region of interest centered at the selected potential match location;
(e) selecting an updated potential match location corresponding to a location having the highest correlation value that is completely within the search region of interest;
(f) repeating steps (d) and (e) for all available resolutions for the reference image; and
(g) select a match location and orientation of a reference image within the acquired image corresponding to the location having the highest correlation value.

13. The method according to claim 12, wherein the first spatial resolution corresponds to a minimum decimated resolution for a reference image generated from a high resolution reference image.

14. The method according to claim 13, wherein the increased spatial resolution of a reference image corresponds to the next highest decimated image resolution for a reference image generated from a high resolution reference image.

15. The method according to claim 12, wherein the first search region of interest corresponds to the entire acquired image.

16. The method according to claim 12, wherein the second search region of interest corresponds to a 6×5 pixel region of interest center around the potential match location.

17. A computer data product readable by a computing system and encoding instructions for implementing a computer method for utilizing a normalized gray scale pattern find within a machine vision system, the method comprising:
(a) correlating a reference image having a first spatial resolution having no particular degree of rotation within a first search region of interest of an acquired image to find a potential match location;
(b) correlating a rotated reference image having the first spatial resolution at a particular degree of rotation within the first search region of interest to find a potential match location;
(c) selecting the potential match location and the particular degree of rotation corresponding to the highest correlation value;
(d) increasing the spatial resolution of the reference image at the particular degree of rotation to generate a new reference image and correlating the new reference image within a second search region of interest centered at the selected potential match location;
(e) selecting an updated potential match location corresponding to a location having the highest correlation value that is completely within the search region of interest;
(f) repeating steps (d) and (e) for all available resolutions for the reference image; and
(g) select a match location and orientation of a reference image within the acquired image corresponding to the location having the highest correlation value.

18. The computer data product according to claim 17, wherein the first spatial resolution corresponds to a minimal decimated resolution for a reference image generated from a high resolution reference image.

19. The computer data product according to claim 18, wherein the increased spatial resolution or a reference image corresponds to the next highest decimated image resolution for a reference image generated from a high resolution reference image.

20. The computer data product according to claim 17, wherein the first search region of interest corresponds to the entire acquired image.

21. The computer data product according to claim 17, wherein the second search region of interest corresponds to a 6×5 pixel region of interest center around the potential match location.

* * * * *

UNITED STATES PATENT AND TRADEMARK OFFICE
CERTIFICATE OF CORRECTION

| | | |
|---|---|---|
| PATENT NO. | : 7,113,652 B2 | Page 1 of 1 |
| APPLICATION NO. | : 10/340168 | |
| DATED | : September 26, 2006 | |
| INVENTOR(S) | : Reiners | |

It is certified that error appears in the above-identified patent and that said Letters Patent is hereby corrected as shown below:

Col. 6, line 38: "system if FIG. 2*b*." should read --system in FIG. 2*b*.--

Col. 14, line 56, claim 4: "when the processing the" should read --when processing the--

Col. 15, line 56, claim 11: "interest center around" should read --interest centered around--

Col. 16, line 15, claim 12: "select a match" should read --selecting a match--

Col. 16, line 32, claim 16: "interest center around" should read --interest centered around--

Col. 16, line 61, claim 17: "select a match" should read --selecting a match--

Col. 18, line 3, claim 21: "interest center around" should read --interest centered around--

Signed and Sealed this

Third Day of April, 2007

JON W. DUDAS
*Director of the United States Patent and Trademark Office*